(12) United States Patent
Mayinger

(10) Patent No.: US 10,837,752 B2
(45) Date of Patent: Nov. 17, 2020

(54) METHOD FOR CAPTURING DYNAMIC VIBRATIONS OF A ROUGHNESS SENSOR, METHOD FOR MEASURING A ROUGHNESS OF A WORKPIECE SURFACE, COMPUTER PROGRAM PRODUCT AND MEASURING DEVICE CONFIGURED TO CARRY OUT THE METHODS

(71) Applicant: Carl Zeiss Industrielle Messtechnik GmbH, Oberkochen (DE)

(72) Inventor: Philipp Mayinger, Aalen (DE)

(73) Assignee: Carl Zeiss Industrielle Messtechnik GmbH, Oberkochen (DE)

( * ) Notice: Subject to any disclaimer, the term of this patent is extended or adjusted under 35 U.S.C. 154(b) by 301 days.

(21) Appl. No.: 15/816,921

(22) Filed: Nov. 17, 2017

(65) Prior Publication Data

US 2018/0073853 A1 Mar. 15, 2018

Related U.S. Application Data

(63) Continuation of application No. PCT/EP2016/057951, filed on Apr. 12, 2016.

(30) Foreign Application Priority Data

May 20, 2015 (DE) .................. 10 2015 209 193

(51) Int. Cl.
*G01B 5/28* (2006.01)
*G01B 11/30* (2006.01)
*G01B 5/008* (2006.01)

(52) U.S. Cl.
CPC .............. *G01B 5/28* (2013.01); *G01B 5/008* (2013.01); *G01B 11/30* (2013.01)

(58) Field of Classification Search
CPC ... G01B 11/005; G01B 11/007; G01B 11/303; G01B 11/2441; G01B 21/04;
(Continued)

(56) References Cited

U.S. PATENT DOCUMENTS

| 4,455,755 A | 6/1984 | Fritsche et al. |
| 4,627,733 A | 12/1986 | Wada |

(Continued)

FOREIGN PATENT DOCUMENTS

| CN | 1550748 A | 12/2004 |
| CN | 1952596 A | 4/2007 |

(Continued)

OTHER PUBLICATIONS

International Preliminary Report on Patentability of the European Patent Office in PCT/EP2016/057951 (from which this application claims priority) dated Nov. 21, 2017 and English-language translation thereof.

(Continued)

*Primary Examiner* — Yaritza Guadalupe-McCall
(74) *Attorney, Agent, or Firm* — Falk Ewers; Ewers IP Law PLLC

(57) ABSTRACT

A method for capturing dynamic vibrations of a roughness sensor of a roughness measuring apparatus is provided. The movement of the roughness sensor relative to the roughness measuring apparatus and/or relative to a surface of a workpiece is captured by a measuring system in the frequency range below 100 Hz with a data capturing rate of greater than 100 Hz. The captured data of the relative movement are made available for further data processing in and/or stored. Moreover, a method for measuring the roughness of a workpiece surface is provided, in which the method for capturing the dynamic vibrations of a roughness sensor is used. In addition, a computer program product for control- (Continued)

ling a roughness sensor of a roughness measuring apparatus in accordance with one of the methods is provided, and a roughness measuring device that is configured to carry out one of the methods.

14 Claims, 4 Drawing Sheets

(58) Field of Classification Search
CPC .......................... G01B 5/008; G01B 9/02004; G01B 9/02007; G01B 9/02055; G01B 9/02091
USPC .......................................................... 33/503
See application file for complete search history.

(56) References Cited

U.S. PATENT DOCUMENTS

| | | | |
|---|---|---|---|
| 5,352,038 | A | 10/1994 | Schmidt et al. |
| 5,579,246 | A | 11/1996 | Ebersbach et al. |
| 6,357,286 | B1 | 3/2002 | Kanematsu et al. |
| 6,510,363 | B1 | 1/2003 | Hidaka et al. |
| 7,162,383 | B2 | 1/2007 | Takemura |
| 7,347,084 | B2 | 3/2008 | Tölzer et al. |
| 7,363,181 | B2 | 4/2008 | Katayama et al. |
| 7,373,807 | B2 | 5/2008 | Hama |
| 7,827,856 | B2 | 11/2010 | Doerrer et al. |
| 8,006,399 | B2 | 8/2011 | Wallace et al. |
| 8,627,576 | B2 | 1/2014 | Engel |
| 9,982,987 | B2 * | 5/2018 | Mayinger ................. G01B 5/28 |
| 2005/0194534 | A1 | 9/2005 | Kneedler et al. |
| 2007/0086620 | A1 | 4/2007 | Arai |
| 2008/0078229 | A1 | 4/2008 | Mancevski et al. |
| 2012/0266475 | A1 | 10/2012 | Nakayama et al. |
| 2017/0299368 | A1 * | 10/2017 | Mayinger ................. G01B 5/28 |
| 2018/0073853 | A1 * | 3/2018 | Mayinger ............... G01B 11/30 |
| 2019/0033056 | A1 * | 1/2019 | Jensen ................. G01B 11/005 |

FOREIGN PATENT DOCUMENTS

| | | |
|---|---|---|
| CN | 101140163 A | 3/2008 |
| CN | 203479263 U | 3/2014 |
| DE | 2640894 A1 | 3/1978 |
| DE | 2937431 A1 | 4/1981 |
| DE | 3247238 A1 | 7/1983 |
| DE | 4342312 A1 | 6/1995 |
| DE | 4437033 A1 | 4/1996 |
| DE | 10020734 A1 | 11/2000 |
| DE | 10020735 A1 | 11/2000 |
| DE | 10230009 A1 | 1/2001 |
| DE | 20120127 U1 | 4/2002 |
| DE | 10334219 B3 | 12/2004 |
| DE | 102004011728 A1 | 9/2005 |
| DE | 102005035786 B3 | 1/2007 |
| DE | 202008011629 U1 | 12/2008 |
| DE | 102009035747 A1 | 3/2010 |
| DE | 202013102043 U1 | 7/2013 |
| DE | 202013102045 U1 | 7/2013 |
| DE | 202013102048 U1 | 7/2013 |
| EP | 2207006 A2 | 7/2010 |
| EP | 2486369 B1 | 12/2014 |
| JP | S59168304 | 9/1984 |

OTHER PUBLICATIONS

Office Action dated Apr. 10, 2019 issued in Chinese counterpart application No. 201680022486.6 and English-language translation thereof.
Office Action dated Nov. 20, 2019 issued in Chinese counterpart application No. 201680022486.6 and English-language translation thereof.
Office Action issued in German Patent Application No. DE 10 2015 209 193.7, dated Jan. 14, 2016 (from which this application claims priority) and English language translation thereof.
Office Action issued in German Patent Application No. DE 10 2015 209 193.7, dated Jun. 15, 22020 (from which this application claims priority) and English language translation thereof.
Office Action issued in Chinese Counterpart Patent Application No. CN 201680022486.6 dated Apr. 30, 2020 and English language translation thereof.

* cited by examiner

METHOD FOR CAPTURING DYNAMIC VIBRATIONS OF A ROUGHNESS SENSOR, METHOD FOR MEASURING A ROUGHNESS OF A WORKPIECE SURFACE, COMPUTER PROGRAM PRODUCT AND MEASURING DEVICE CONFIGURED TO CARRY OUT THE METHODS

CROSS REFERENCE TO RELATED APPLICATIONS

This application is a continuation application of international patent application PCT/EP2016/057951, filed Apr. 12, 2016, designating the United States and claiming priority from German application 10 2015 209 193.7, filed May 20, 2015, and the entire content of both applications is incorporated herein by reference.

TECHNICAL FIELD

The present invention relates to a method for capturing dynamic vibrations of a roughness sensor, a method for measuring a roughness of a workpiece surface, a computer program product, and a measuring device that is configured to carry out the methods.

BACKGROUND

Roughness sensors for measuring the roughness of a workpiece surface are surface sensors within the meaning of the present invention and are known from, e.g., U.S. Pat. No. 6,357,286, German patent document DE 102 30 009 A1, U.S. Pat. Nos. 7,347,084, 7,827,856, German patent document DE 201 20 127 U1, German patent document DE 20 2013 102 043 U1, German patent document DE 20 2013 102 045 U1, U.S. Pat. Nos. 8,006,399, 7,363,181 B2, 7,373,807 B2 and U.S. Patent Application Publication No. 2012/0266475 A1. Moreover, there are also optical roughness sensors within the meaning of the present invention; these are known, e.g., from U.S. Pat. No. 5,352,038.

German patent document DE 44 37 033 A1 discloses an advancing device for exactly guiding a roughness sensor using the stylus method, which, in contrast to a skidded guide (in this respect, see German patent document DE 26 40 894), facilitates capturing the waviness or the form of a workpiece in addition to capturing the roughness. However, a disadvantage of a roughness sensor in accordance with German patent document DE 44 37 033 A1 is that the latter is very sensitive to vibrations, which often also leads to unnoticed measurement inaccuracies or malfunctions, and, therefore, this roughness sensor is regularly only suitable for a laboratory setting. Further, the roughness sensor requires much outlay for servicing and calibration, it is expensive, and it is therefore often only used for random checks. Here, as a rule, the sensor is calibrated based on roughness standards with a known roughness.

Therefore, the document DE 20 2008 011 629 U1 proposes a different roughness sensor for use in production environments. The roughness sensor includes a vibration detector for capturing the vibrations present in the production environments. Further, the roughness sensor includes suitable interfaces for data communication. As a result, the roughness sensor becomes complex and expensive. Moreover, known vibration detectors in the form of accelerometers are inaccurate and complicated, particularly for slow movements.

Moreover, there are also approaches for capturing highly dynamic changes of movements of measuring heads of coordinate measuring apparatuses, particularly in the case of collisions, by position change sensors, see U.S. Pat. No. 8,627,576. However, this approach requires the attachment of a plurality of position change sensors for capturing highly dynamic changes of movements which cannot be captured by the dedicated sensors of the coordinate measuring apparatus because of their sampling rates which are lower, and which cannot be calculated from the data thereof that were obtained at the lower sampling rate.

SUMMARY

It is therefore an object of the present invention to provide a method, with the aid of which a simple, compact, cost-effective roughness measuring apparatus can be utilized in a manufacturing environment.

The object is achieved by providing a method for capturing the dynamic vibrations of a roughness sensor of a roughness measuring device, wherein the relative movement of the roughness sensor in relation to the roughness measuring device and/or relative to a surface of a workpiece to be measured is captured in the frequency range below 100 Hz with a data capturing rate of greater than 100 Hz by at least one additional measuring system in a first method step, and wherein the captured data of the relative movement are made available for further data processing in a second method step and/or stored in a third method step.

An additional measuring system for capturing the relative movement of a roughness sensor relative to a roughness measuring device, on which the roughness sensor is mounted, may be provided, e.g., by a probe head of a coordinate measuring apparatus. The coordinate measuring apparatus with probe head, on which the roughness sensor is mounted, serves as a roughness measuring apparatus in this case. The probe head is a measuring probe head, for example with an active probing force production, which is usually designed for scanning capture of stylus contacts and therefore includes dynamic tactile sensors; see, e.g., German patent document DE 10 2004 011 728 A1. When using a roughness sensor, the dynamic tactile sensors of the probe head according to an aspect of the invention are used for capturing the relative movement of the roughness sensor relative to the roughness measuring device or the coordinate measuring apparatus instead of the otherwise conventional capture of scanning data of a stylus.

As an alternative to measuring the relative movement of the roughness sensor relative to the roughness measuring apparatus, an additional measuring system may also be embodied to capture the relative movement of the roughness sensor relative to the surface of a workpiece to be measured by contactless distance measuring sensors and/or by dynamic tactile sensors. Here, contactless distance measuring sensors may include optical, capacitive, inductive, or sound-based sensors. By contrast, dynamic tactile sensors can be designed in a manner analogous to the system that is distributed by the applicant under the name "VAST®" and is disclosed in document DE 10 2004 011 728 A1. Then, capturing the relative movement of the roughness sensor relative to the workpiece surface is possible by these alternative measuring systems, from which corresponding data then emerge for the movement or vibration of the roughness sensor. Naturally, an additional measuring system of a roughness measuring device may also include a plurality of measuring systems, which capture both the relative movement of the roughness sensor relative to the roughness measuring apparatus and the relative movement of the roughness sensor relative to the workpiece.

According to an aspect of the invention, it was recognized that, for the purposes of measuring a relative movement of a roughness sensor and, as a result, of the vibrations of the roughness sensor, it is possible to use either already present measuring systems of a roughness measuring apparatus, for example in the form of a probe head with dynamic tactile sensors, by which the roughness sensor is mounted to the roughness measuring device, or additional measuring systems for capturing the distance from the workpiece surface to be measured. In the first case, the already available measuring systems are only additionally read in order to obtain measurement values or data for the relative movement of the roughness sensor and, as a result, for the vibrations thereof. Only additional distance sensors for a distance measurement are required in the second case, which are generally cost-effective. In both cases, the data in this respect in the frequency range below 100 Hz are evaluated with a sampling rate of greater than 100 Hz. This low frequency range in combination with the low sampling rate specifically for capturing the vibrations is unusual both for reading dynamic tactile sensors of a probe head and for recognizing collisions using distance sensors. As a rule, a very high sampling rate is sought after in the case of the dynamic tactile sensors of a probe head to permit the probe head to facilitate a capture that is as fast as possible of a contact line with a workpiece to be measured by the stylus of a coordinate measuring apparatus during the so-called scanning. However, as a rule, the dynamic tactile sensors of a probe head have a lower sampling rate than position change sensors as specified in EP 2 486 369, by means of which it is even possible to capture collisions. Accordingly, attempts are made to read the distance sensors with a very high sampling rate when recognizing collisions by said distance sensors as well, for example when reversing in a motor vehicle, in order to capture the approach of an obstacle as early as possible, even in the case of a high velocity of approach. As a result, a frequency range below 100 Hz is considered when capturing vibrations according to an aspect of the invention by the sensors and the frequency range is evaluated with a sampling rate of greater than 100 Hz, the sampling rate playing a subordinate role in other applications of these sensors.

Capturing a frequency range below 20 Hz with a data capturing rate of greater than 200 Hz of the relative movements of a roughness sensor is expedient here for measuring vibrations since this sound frequency range is predominant in a manufacturing environment and since the capturing of a period of the vibration of the relative movement of the roughness sensor with approximately 10 or more nodes is sufficient to this end.

A complicated structure or design of the roughness sensor can be avoided by the present invention by the alternative use of a probe head in the frequency range of less than 100 Hz with a sampling rate of greater than 100 Hz as a measuring system for measuring the vibration of a roughness sensor attached thereto and/or by the use of additional measuring systems in the form of cost-effective distance sensors. Unlike in the related art, a roughness sensor need not be equipped with a second measuring needle or an expensive vibration detector. Moreover, such a vibration detector is not able to map temporally slow processes with a high accuracy.

By the captured data of the relative movement of the method according to an aspect of the invention being made available for further data processing in a second method step and/or being stored in a third method step, it is possible to undertake a subsequent vibration correction of the roughness measurement values and/or subsequently label the roughness measurement values in accordance with the determined vibration. As a result, a compact and cost-effective roughness measuring apparatus is provided, said roughness measuring apparatus being able to be used in a manufacturing environment and being able to supply standardized roughness measurement values of workpieces in this environment, either by virtue of the bothersome vibrations being removed from the captured roughness values by calculation or by roughness values that are invalid on account of vibrations that are too large being denoted accordingly.

In an exemplary embodiment of a method according to an aspect of the invention, characteristics are ascertained for the relative movement of the roughness sensor in a subsequent fourth method step based on a statistical evaluation of the captured data of the relative movement. Conclusions about the influence of vibrations on a roughness measurement can be drawn based on these characteristics.

In a further exemplary embodiment of the method according to the aspect of the invention, the ascertained characteristics are compared to predetermined threshold values for the relative movement of the roughness sensor in a subsequent fifth step and a fault signal is generated if the threshold values are exceeded. This renders it possible to systematically characterize roughness measurements associated with threshold values being exceeded as invalid. It is also possible to evaluate the specific effect of the fault on individual roughness parameters and to evaluate what can be used to make a reasoned statement about the certainty of a roughness parameter.

By way of example, by using the root mean square of the captured data of the relative movement in a further exemplary embodiment, it is possible to ascertain resilient characteristics for the environmental influences in the form of vibrations, based on which a general decision can be made as to whether a meaningful measurement of the roughness of a workpiece surface is possible. These characteristics also facilitate a comparative assessment of installation locations of a roughness measuring apparatus. By way of example, a fault signal is generated if the threshold values are exceeded. This fault signal may be displayed on a monitor or it may also be used to mark roughness values of a workpiece surface, ascertained immediately therebefore or thereafter and at the same time, as invalid. The roughness values may be marked likewise in a graphical manner, for example by a corresponding color display on a monitor, or else purely in the software within the measurement value files.

Further, the object of the present invention is achieved by providing a method for measuring the roughness of a workpiece surface by a roughness sensor of a roughness measuring apparatus, the method including: an already presented method according to an aspect of the invention for capturing the dynamic vibrations of a roughness sensor of a roughness measuring apparatus; and the method step of measuring the roughness of a surface portion of the workpiece surface by the roughness sensor, wherein the data captured during the roughness measurement are corrected in a subsequent step on the basis of the data obtained simultaneously when capturing the dynamic vibrations and, as a result, corrected roughness measurement values are obtained. The use of the method or of simpler and more compact roughness sensors is facilitated in a manufacturing environment by correcting the roughness measurement values based on the determined vibrations of the roughness sensor.

Moreover, the object of the present invention is achieved by providing a method for measuring the roughness of a workpiece surface by a roughness sensor of a roughness measuring apparatus, the method including: an already presented method for capturing the dynamic vibrations of a roughness sensor of a roughness measuring device, wherein characteristics for the dynamic vibrations are ascertained; and a method step of measuring the roughness of a surface portion of the workpiece surface by the roughness sensor, wherein the data captured during the roughness measurement are corrected simultaneously in a subsequent step based on the ascertained characteristics when capturing the dynamic vibrations and, as a result, averaging-corrected roughness measurement values are obtained. As a result, roughness values of a roughness sensor can be corrected based on the determined vibrations in the case where the sampling rate for measuring the roughness values and the sampling rate for measuring the vibration of the roughness sensor do not correspond. Therefore, the method according to an aspect of the invention can also be used to operate commercial roughness sensors, the sampling rate of which does not correspond to the vibration sampling rate of a VAST® probe head, including such a probe head on a coordinate measuring apparatus in a manufacturing environment.

According to another aspect of the invention, a method for measuring the roughness of a workpiece surface is provided, in which user information about the roughness of the workpiece surface is ascertained and output in a further method step based on the corrected roughness measurement values and/or the averaging-corrected roughness measurement values. Here, the user information may be referred directly to the user or the operator of the roughness sensor by the output on a monitor, or else they may be forwarded to the control software or the user of the roughness sensor. The user information contain measurement value information items about the ascertained roughness values of the measured surface, in which the characteristics for correction purposes have been incorporated.

Moreover, the object of the present invention is achieved by providing a computer program product for controlling a roughness sensor of a roughness measuring device in accordance with one of the methods already presented above.

The object of the present invention is likewise achieved by a measuring device comprising a roughness sensor with at least one measuring system for capturing the dynamic vibrations of the roughness sensor and a control and/or an evaluation unit configured to carry out one of the methods presented above.

In an exemplary embodiment of the roughness measuring apparatus according to an aspect of the invention, the measuring system for capturing the dynamic vibrations of the roughness sensor includes at least one distance measuring sensor that operates contactlessly or at least one dynamic tactile sensor. As a result, roughness measuring apparatuses using commercial roughness sensors can be retrofitted with cost-effective sensors so that they can be used in a manufacturing environment.

Further features and advantages of the invention emerge from the following description of exemplary embodiments of the invention based on the figures, which show details of the invention, and from the claims. The individual features may be realized in each case individually by themselves or as a plurality in any desired combination in a variant of the invention.

BRIEF DESCRIPTION OF THE DRAWINGS

The invention will now be described with reference to the drawings wherein.

DESCRIPTION OF EXEMPLARY EMBODIMENTS

Figure 1:
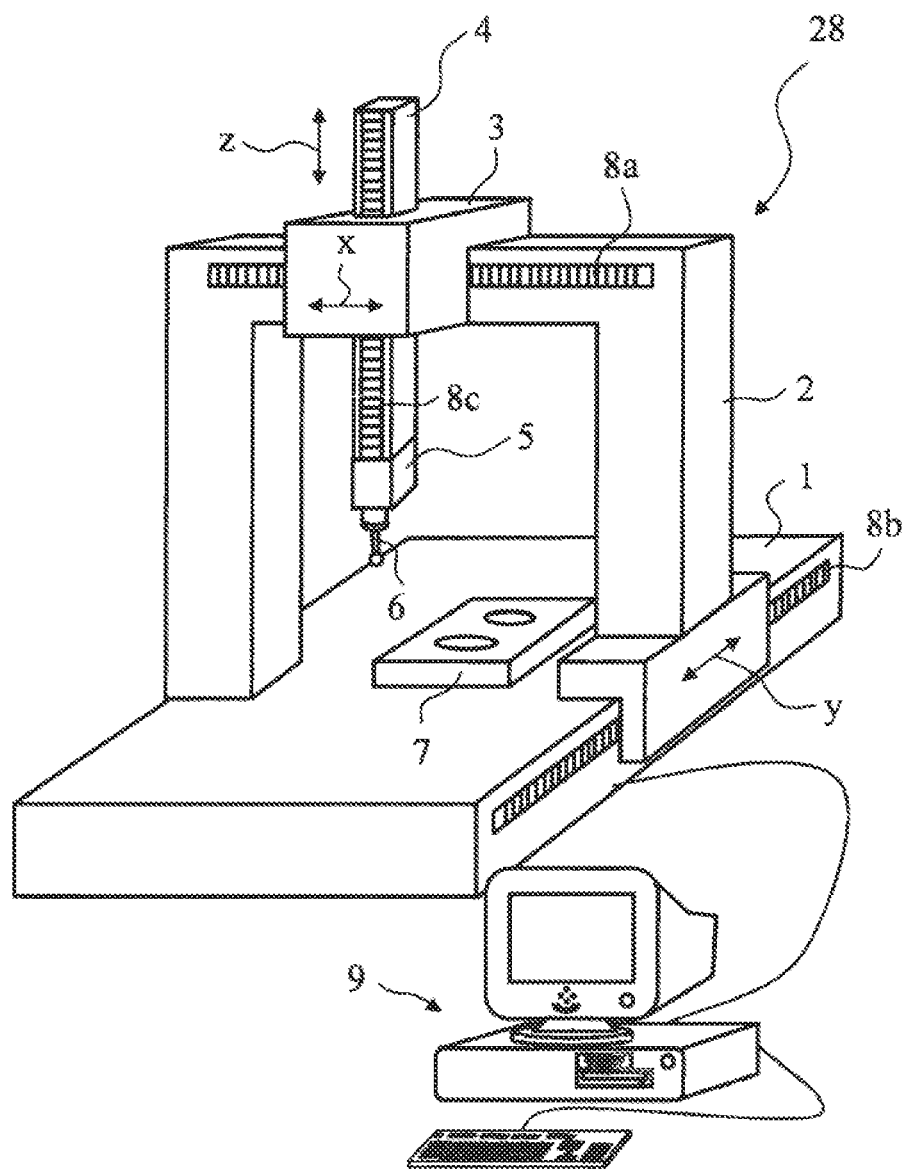
FIG. 1 shows a schematic illustration of a coordinate measuring apparatus with a portal design.

FIG. 1 shows a coordinate measuring apparatus 28 with a quill 4 with a so-called portal design in a purely exemplary manner. However, it is understood that the present invention may be used in all types of roughness measuring apparatuses, and hence, in particular, also in other coordinate measuring apparatus designs that are not explicitly depicted here.

The coordinate measuring apparatus 28 has a stylus 6 for measuring the coordinates of a workpiece 7. The stylus is fastened in a replaceable manner to a measuring or probe head 5 and may be deflected relative to the probe head 5 in the three coordinate directions x, y, and z. The deflection of the stylus 6 in the three coordinate directions x, y, and z is detected by way of three transducers located in the probe head 5. The probe head 5 in turn may be moved in the three coordinate directions x, y, and z. The portal mechanism includes a measuring portal 2, which may be displaced relative to the measurement table 1 in the coordinate direction denoted by the arrow y. A measuring slider 3 is movably guided in the direction denoted by the arrow x along the crossbeam of the measuring portal 2 spanning the measurement table 1. The quill 4 is movably guided on the measuring slider 3 in the vertical direction denoted by the arrow z such that the probe head 5 may be displaced in the three coordinate directions x, y, and z by the portal mechanism. In the case of a coordinate measuring apparatus with a bridge design, a measuring bridge adopts the task of the measuring portal 2 of displacing the measuring slider 3 with the quill 4 in the coordinate direction y. A workpiece is measured in such a way that the stylus 6 probes the workpiece 7 to be measured at predetermined measurement points, wherein the deflection in terms of the three coordinate directions x, y, and z of the stylus 6 in relation to the probe head 5 is measured in the probe head 5. Additionally, the current position of the probe head 5 is measured in the three coordinate directions x, y, and z at the three incremental scales 8a to 8c, which are scanned by optical reader heads. To ascertain a measurement point, the scale measured values 8a to 8c are combined by calculation in terms of the correct components with the stylus deflections ascertained by the transducers in the probe head 5 and a measurement point is generated therefrom.

Different styluses are usually required in order to be able to measure complex workpieces with a complex geometry and these styluses are stored in a cartridge (not depicted here) and may be exchanged in an automated manner by way of a changer apparatus at the probe head 5. The different styluses usually have one or more probe shafts, at the ends of which it is possible to fasten a probe body, e.g., a probe sphere or a cylinder. By way of example, a horizontal bore is measured using a horizontally aligned probe shaft, i.e., by using a laterally arranged stylus 6, while a vertical bore is measured by using a vertically aligned probe shaft.

The measurement process and the drive of the coordinate measuring apparatus are controlled, and the measured values ascertained in the process are recorded and evaluated by a control and evaluation unit 9, which, in an exemplary manner, is realized by a single computer in this exemplary embodiment. The control and evaluation unit 9 may additionally be connected to an operating console (not depicted) by which the coordinate measuring apparatus may also be displaced manually in the coordinate directions x, y and z by way of operating lever and by which it is also possible to undertake other functions, e.g., a change of stylus or an operation of the measuring program.

Figure 2:
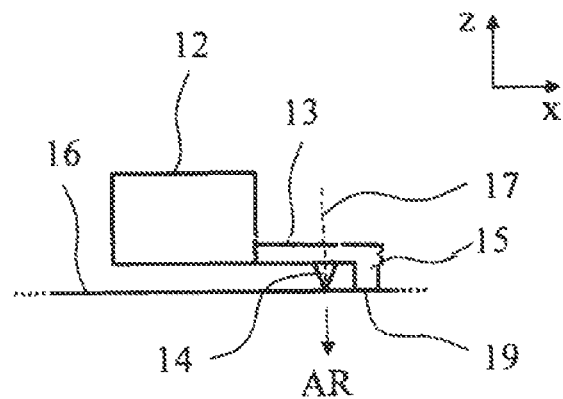
FIG. 2 shows a schematic illustration of a roughness sensor for a roughness measuring apparatus.
Figure 4:
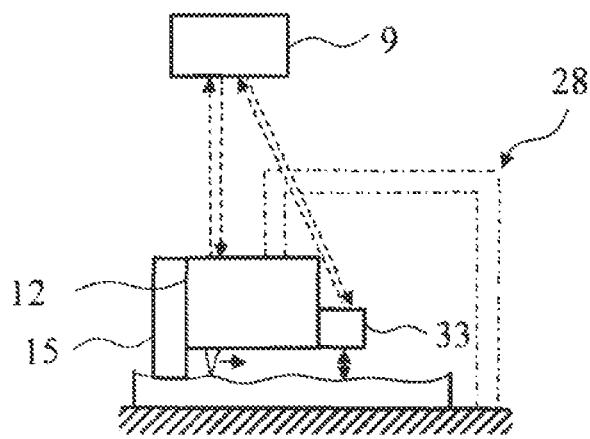
FIG. 4 shows a schematic illustration of a coordinate measuring apparatus including an attached roughness sensor and an additional measuring system as a roughness measuring apparatus.

As an alternative to the probe head 5 shown in FIG. 1, the coordinate measuring apparatus 28 in FIG. 1 may also be equipped with an optical measuring system or with a roughness sensor 12 in accordance with FIGS. 2 and 4 as a measuring head 5. The roughness sensor 12 may also be fastened to the quill of the coordinate measuring apparatus 28 by a rotary swivel joint. An arbitrary orientation of the roughness sensor 12 in space in relation to the surface of the workpiece to be measured is facilitated by such a rotary swivel joint.

Figure 3:
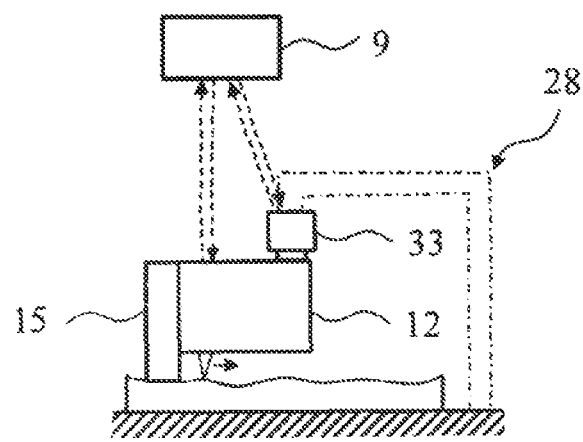
FIG. 3 shows a schematic illustration of a coordinate measuring apparatus including a roughness sensor attached via a probe head as a roughness measuring apparatus.

Further, as shown in FIG. 3, a roughness sensor 12 may also be fastened to the quill of a coordinate measuring apparatus 28 via a measuring probe head 5 with an active probing force production, for example the VAST® probe head by the applicant. The VAST probe head serves as a measuring system 33 for capturing the vibration movements of the roughness sensor 12 relative to the coordinate measuring apparatus 28. Alternatively, the roughness sensor 12 in accordance with FIG. 4 may also be fastened to the coordinate measuring apparatus 28 without a measuring probe head and a separate measuring system 33 captures the distance between the roughness sensor 12 and the workpiece 7 to be measured. As a result, it is also possible to capture the vibration movements of the roughness sensor, this time relative to the workpiece 7. The combination of the measuring probe head (FIG. 3) and the separate measuring system 33 (FIG. 4) is also possible.

FIG. 2 shows a schematic illustration of a roughness sensor 12. The roughness sensor 12 includes a probing arm 13 and a measuring needle 14, which is arranged at a free end of the probing arm 13. The measuring needle 14 has a conical embodiment. The roughness sensor 12 includes a support element 15 and the roughness sensor is placed on a surface 16 of a workpiece to be measured (not depicted in any more detail). The measuring needle 14 rests on the surface 16.

The measuring needle 14 may be moved along a preferably linear measurement path along a longitudinal axis x for the purposes of measuring the roughness of the surface 16 of the workpiece to be measured. In the process, the measuring needle 14, and hence the probing arm 13 as well, may be deflected. The deflection occurs in a y-z-plane lying perpendicular to the x-direction with, at least proportionally, the greatest value in a vertical direction, which is indicated by a vertical axis z. Depicted further is a center line 17 of the measuring needle 14, with a probing direction AR of the roughness sensor 12, in a non-deflected state of the roughness sensor 12, being oriented along the centre line 17 and counter to the vertical direction z explained above.

The probing direction AR in this case corresponds to a placement direction of the roughness sensor 12, with the placement direction being oriented perpendicular to a contact area 19 of the roughness sensor 12. The contact area 19 denotes an area which is in contact with the surface 16 of the workpiece when the roughness sensor 12 is placed.

FIG. 3 shows a roughness sensor 12 in accordance with FIG. 2 that is attached via a measuring probe head with an active probing force production as a measuring system 33 to a coordinate measuring apparatus 28 in accordance with FIG. 1 as a roughness measuring apparatus, wherein a control and evaluation unit 9 adopts the control and data evaluation of both the measuring system 33 and the roughness sensor 12 (indicated in FIG. 3 by dashed arrows) in addition to the control and evaluation of the coordinate measuring apparatus 28. The measuring system 33 in FIG. 3 corresponds to a measuring probe head 5 with active probing force production in FIG. 1. According to an exemplary embodiment of the invention, this measuring system 33 serves to capture the vibration movements of the roughness sensor 12 relative to the coordinate measuring apparatus 28. By connecting a conventional roughness sensor 12 in accordance with FIG. 2 to a conventional coordinate measuring apparatus in accordance with FIG. 1 by a measuring probe head 5 with active probing force production, it is possible, according to an exemplary embodiment of the invention, to use the sensor system and actuation of this conventional probe head 5 as a measuring system 33 for capturing the vibrations of the roughness sensor 12 by the movement of the roughness sensor being read at the plate of the measuring probe head 5 with the aid of a magnetic differential transformer (LVDT).

Alternatively, FIG. 4 shows a roughness sensor 12 in accordance with FIG. 2 being connected to a coordinate measuring apparatus 28 in accordance with FIG. 1 as a roughness measuring apparatus, wherein a measuring system 33 that is located on the roughness sensor 12 monitors the distance of the roughness sensor 12 from the surface of the workpiece 7 to be measured. As a result, it is possible to capture the vibrations of the roughness sensor 12 as a change in distance from the workpiece 7. The measuring system 33 for capturing the dynamic vibrations of the roughness sensor 12 includes at least one distance measuring sensor 33 that operates contactlessly or at least one dynamic tactile sensor 33. The sensor can be placed on any point on the roughness sensor 12. Using a stylus, the dynamic tactile sensor 33 can have an embodiment that is optical (white light interferometry, laser interferometer, confocal microscopy, laser triangulation, light time-of-flight measurement), acoustic (ultrasonic sensors), inductive (magnetic coil sensors) or capacitive, and analogous to a distance sensor that operates contactlessly.

In the exemplary embodiment shown to FIG. 4, a control and evaluation unit 9 adopts the actuation and data evaluation of both the measuring system 33 and the roughness sensor 12 (indicated by dashed arrows in FIG. 4) in addition to the control and evaluation of the coordinate measuring apparatus 28.

In the exemplary embodiments shown in FIG. 3 and FIG. 4, it is necessary for the data in the frequency range below 100 Hz to be evaluated with a sampling rate of greater than 100 Hz. As already set forth at the outset, this low frequency range in combination with the low sampling rate specifically for the vibration capture is unusual, both for the readout of dynamic tactile sensors of a probe head, like the VAST® sampling system, and for the detection of collisions using distance sensors in accordance with EP 2 486 369. In particular, capturing the dynamic vibrations of a roughness sensor 12 of a roughness measuring apparatus 28 in the frequency range below 20 Hz with a data capturing rate of greater than 200 Hz is necessary and expedient for the use according to the exemplary embodiment of the invention in a manufacturing environment.

Figure 5:
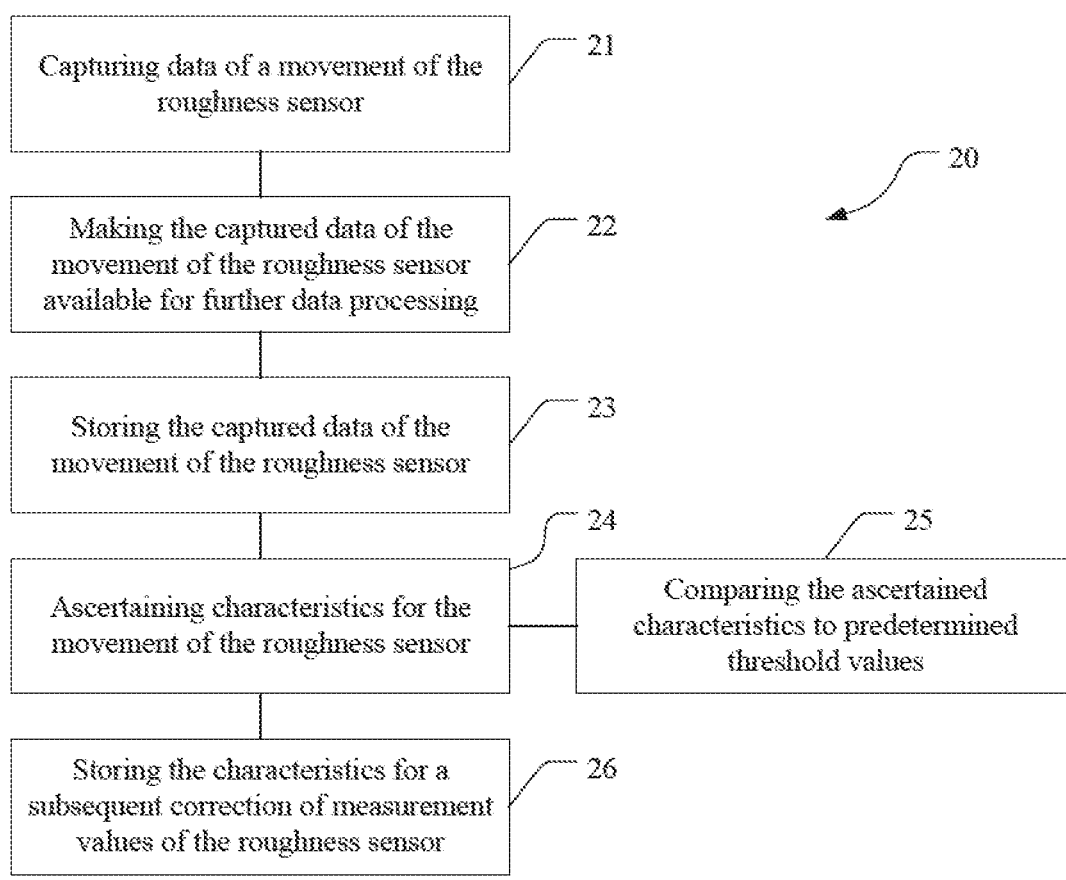
FIG. 5 shows a flowchart of the vibration measurement method according to an exemplary embodiment of the invention.

FIG. 5 schematically shows a flowchart of method 20 according to an exemplary embodiment the invention for capturing the dynamic vibrations of a roughness sensor 12 of a roughness measuring apparatus 28, wherein the relative movement of the roughness sensor 12 relative to the roughness measuring apparatus 28 and/or relative to a surface 16 of a workpiece to be measured is captured by at least one additional measuring system 33 in the frequency range below 100 Hz with a data capturing rate of greater than 100 Hz in a first method step 21 and wherein the captured data of the relative movement are made available for further data processing in a second method step 22 and/or stored in a third method step 23. As a result, it is possible to capture the environmental influences in the form of vibrations on the roughness sensor 12, in particular in a manufacturing environment, and either to make these environmental influences available or store these environmental influences for further data processing. As an alternative to the illustration shown in FIG. 5, method step 23 may also be carried out before method step 22.

Characteristics are ascertained for the relative movement of the roughness sensor 12 in a subsequent fourth method step 24 based on a statistical evaluation of the captured data of the relative movement. Then, an evaluation of the order of magnitude of the environmental influences is possible based on the statistical evaluation.

Further, the ascertained characteristics are compared to predetermined threshold values for the relative movement of the roughness sensor 12 in a subsequent fifth step 25 and a fault signal is generated if the threshold values are exceeded. These threshold values therefore represent limits for the characteristics. A reliable roughness measurement of a workpiece surface is possible below the thresholds or limits; the interferences by environmental influences on a roughness measurement of a workpiece surface are significant above the thresholds or limits.

In a further step 26, the characteristics may be stored for a subsequent correction of the measurement values of the roughness sensor 12. Alternatively, these characteristics may also be stored together with the instances of exceeding or staying below the thresholds determined in step 25.

Figure 6:
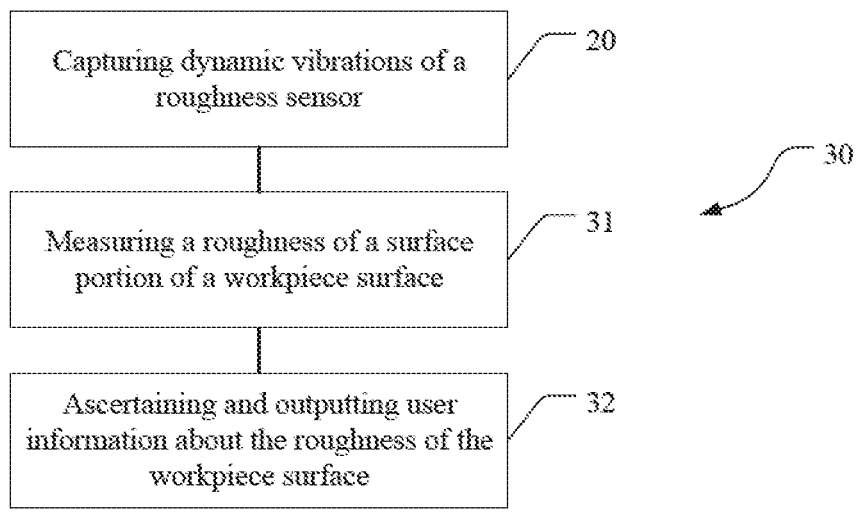
FIG. 6 shows a flowchart of the roughness measurement method according another exemplary embodiment of to the invention.

FIG. 6 shows a flowchart of method 30 according to an exemplary embodiment of the invention for measuring the roughness of a workpiece surface 16 by a roughness sensor 12 of a roughness measuring apparatus 28. The method includes: the method 20 for capturing the dynamic vibrations of a roughness sensor 12 of a roughness measuring apparatus 28 in shown in FIG. 5; and the method step 31 of measuring the roughness of a surface portion of the workpiece surface 16 by the roughness sensor 12, wherein the data captured during the roughness measurement are corrected in a subsequent step based on the data obtained simultaneously when capturing the dynamic vibrations and, as a result, corrected roughness measurement values are obtained.

Alternatively, it is also possible that the method 30 according to an exemplary embodiment of the invention for measuring the roughness of a workpiece surface 16 by a roughness sensor 12 of a roughness measuring apparatus 28 in accordance with FIG. 6 includes firstly the method 20 for capturing the dynamic vibrations of a roughness sensor 12 of a roughness measuring apparatus 28 in accordance with FIG. 5; and secondly includes a method step 31 of measuring the roughness of a surface portion of the workpiece surface 16 by the roughness sensor 12, wherein the data captured during the roughness measurement are corrected in a subsequent step based on the characteristics ascertained simultaneously when capturing the dynamic vibrations and, as a result, averaging-corrected roughness measurement values are obtained.

User information about the roughness of the workpiece surface 16 are ascertained and output in a further method step 32 based on the corrected and/or averaging-corrected roughness measurement values. The user information takes account of, firstly, the captured roughness measurement values of the workpiece surface 16 and, secondly, the data from the vibration measurement.

In the simplest case, the user information consist only of the corrected and/or averaging-corrected roughness measurement values. However, it is also possible to form more complicated mathematical relationships between the roughness measurement values and the characteristics for producing user information in order, by way of the user information, to output the "true" surface roughness in the form of measurement values. Therefore, the user information are resultant roughness values which, taking into account the vibration measurement values, are output to the user in the form of an operator of the roughness sensor 12 on a monitor, or which are provided to the user in the form of evaluation software by a file or measurement value format.

The methods 20 and 30 depicted in FIGS. 5 and 6 according to exemplary embodiments of the invention, may be carried out by appropriate software with the aid of, e.g., the control and evaluation unit 9 (processor) of the coordinate measuring apparatus 28 shown in FIG. 1, or with the aid of, e.g., a separate control and evaluation unit of the roughness sensor 12 shown in FIG. 2, or with the aid of, e.g., a separate control and evaluation unit of a separate measuring device for handling a roughness sensor 12. A corresponding computer program product for controlling a roughness sensor 12 may be provided by any type of non-transitory computer readable storage medium for the aforementioned control and evaluation units.

Therefore, the present invention also includes measuring devices which are configured to carry out the methods 20 and 30 according to an exemplary embodiment of the invention and which include a roughness sensor 12, and a control and evaluation unit. By way of example, such a measuring apparatus may be a coordinate measuring apparatus 28 as shown in FIG. 1 or a separate measuring device, not depicted in any more detail, for handling roughness sensors.

It is understood that the foregoing description is that of the exemplary embodiments of the invention and that various changes and modifications may be made thereto without departing from the spirit and scope of the invention as defined in the appended claims.

What is claimed is:

1. A method for capturing dynamic vibrations of a roughness sensor of a roughness measuring apparatus, the method comprising:
   (a) capturing data representing a movement of the roughness sensor relative to at least one of the roughness measuring apparatus and relative to a surface of a workpiece to be measured by at least one measuring system with a data capturing rate larger than 100 Hz, and the movement of the roughness sensor being in a frequency range below 100 Hz;
(b) making the captured data of the movement of the roughness sensor available for further data processing; and
(c) storing the data representing the movement of the roughness sensor.

2. The method of claim 1, wherein the movement of the roughness sensor is captured in a frequency range below 20 Hz with a data capturing rate of greater than 200 Hz.

3. The method of claim 2, further comprising:
(d) ascertaining characteristics for the movement of the roughness sensor based on a statistical evaluation of the captured data of the movement of the roughness sensor.

4. The method of claim 3, further comprising:
(e) comparing the ascertained characteristics to predetermined threshold values for the movement of the roughness sensor, and
(f) generating a fault signal if the threshold values are exceeded.

5. A method for measuring a roughness of a workpiece surface by a roughness sensor of a roughness measuring apparatus, the method comprising:
the method for capturing the dynamic vibrations of the roughness sensor of the roughness measuring apparatus according to claim 3;
measuring the roughness of a surface portion of the workpiece surface by the roughness sensor; and
subsequently correcting data captured during the measuring of the roughness of the surface portion of the workpiece surface based on the characteristics ascertained simultaneously when capturing the dynamic vibrations of the roughness sensor to generate averaging-corrected roughness measurement values.

6. The method of claim 1, further comprising:
(d) ascertaining characteristics for the movement of the roughness sensor based on a statistical evaluation of the captured data of the movement of the roughness sensor.

7. The method of claim 6, further comprising:
(e) comparing the ascertained characteristics to predetermined threshold values for the movement of the roughness sensor, and
(f) generating a fault signal if the threshold values are exceeded.

8. A method for measuring a roughness of a workpiece surface by a roughness sensor of a roughness measuring apparatus, the method comprising:
the method for capturing the dynamic vibrations of the roughness sensor of the roughness measuring apparatus according to claim 6;
measuring the roughness of a surface portion of the workpiece surface by the roughness sensor; and
subsequently correcting data captured during the measuring of the roughness of the surface portion of the workpiece surface based on the characteristics ascertained simultaneously when capturing the dynamic vibrations of the roughness sensor to generate averaging-corrected roughness measurement values.

9. The method of claim 8, further comprising:
ascertaining user information about the roughness of the workpiece surface based on the averaging-corrected roughness measurement values; and
outputting the ascertained user information about the roughness of the workpiece surface.

10. A method for measuring a roughness of a workpiece surface by a roughness sensor of a roughness measuring apparatus, the method comprising:
the method for capturing dynamic vibrations of the roughness sensor of the roughness measuring apparatus according to claim 1;
measuring a roughness of a surface portion of the workpiece surface by the roughness sensor; and
subsequently correcting data captured during the measuring of the roughness of the surface portion of the workpiece surface based on the captured data of the movement of the roughness sensor obtained simultaneously when capturing the dynamic vibrations of the roughness sensor to generate corrected roughness measurement values.

11. The method of claim 10, further comprising:
ascertaining user information about the roughness of the workpiece surface based on the corrected roughness measurement values; and
outputting the ascertained user information about the roughness of the workpiece surface.

12. A non-transitory computer readable storage medium encoded with program code comprising computer executable instructions for controlling a roughness sensor of a roughness measuring apparatus and when executed operable to:
(a) capture data representing a movement of the roughness sensor relative to at least one of the roughness measuring apparatus and a surface of a workpiece to be measured by at least one measuring system with a data capturing rate larger than 100 Hz, and the movement of the roughness sensor being in a frequency range below 100 Hz;
(b) make the captured data of the movement of the roughness sensor available for further data processing; and
(c) store the data representing the movement of the roughness sensor.

13. A roughness measuring apparatus comprising:
a roughness sensor,
at least one measuring system configured to capture dynamic vibrations of the roughness sensor,
at least one of a control unit and an evaluation unit configured to:
(a) capture data representing a movement of the roughness sensor relative to at least one of the roughness measuring apparatus and surface of a workpiece to be measured by the at least one measuring system with a data capturing rate larger than 100 Hz, and the movement of the roughness sensor being in a frequency range below 100 Hz;
(b) make the captured data of the movement of the roughness sensor available for further data processing; and
(c) store the captured data of the movement of the roughness sensor.

14. The roughness measuring apparatus of claim 13, wherein the at least one measuring system for capturing the dynamic vibrations of the roughness sensor includes at least one distance measuring sensor that operates contactlessly or at least one dynamic tactile sensor.

* * * * *